J. VAGHI.
CONVERTIBLE BOAT AND TENT.
APPLICATION FILED MAR. 5, 1909.
931,529.
Patented Aug. 17, 1909.
5 SHEETS—SHEET 3.
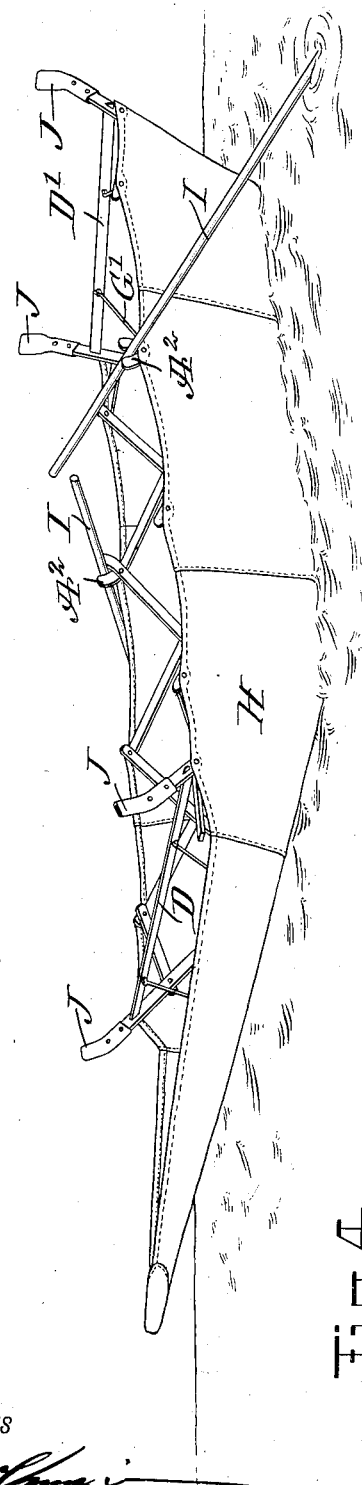
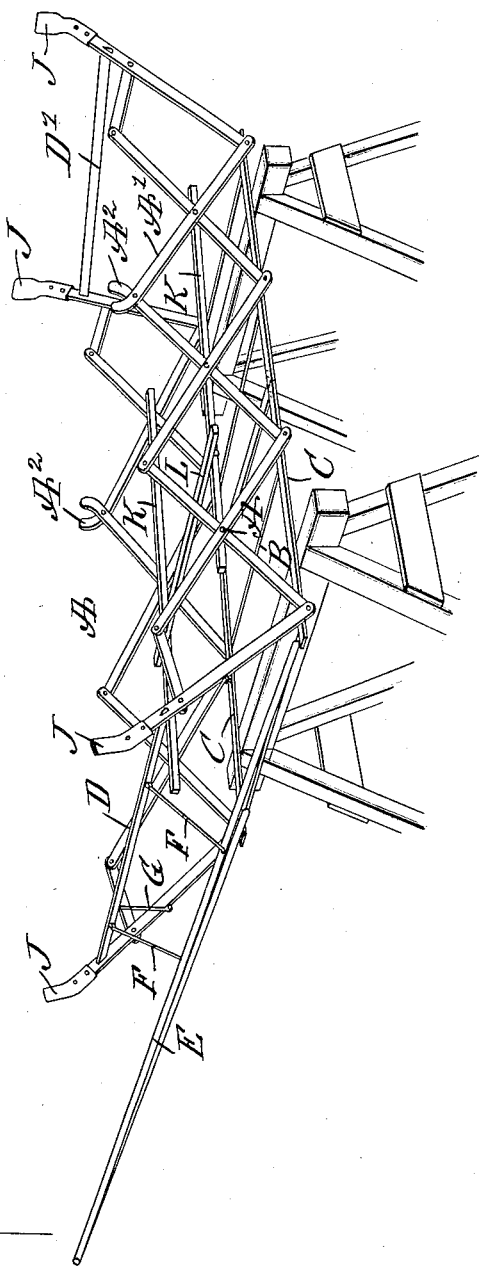
WITNESSES
INVENTOR
Joseph Vaghi
BY
ATTORNEYS J. VAGHI.
CONVERTIBLE BOAT AND TENT.
APPLICATION FILED MAR. 5, 1909.
931,529.
Patented Aug. 17, 1909.
5 SHEETS—SHEET 4.
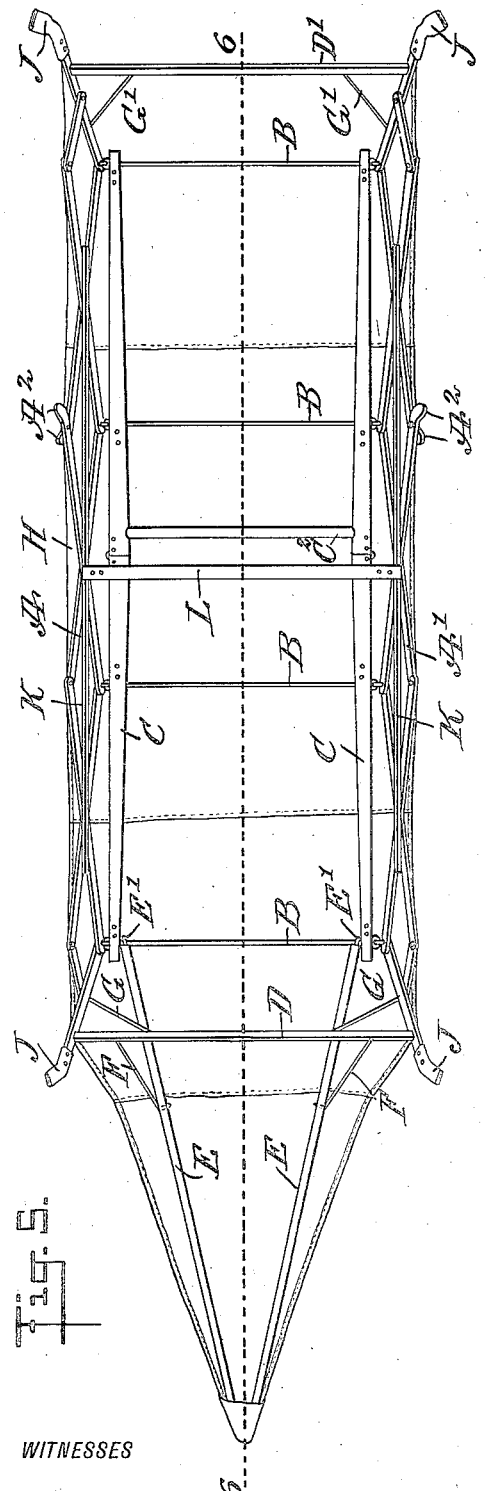
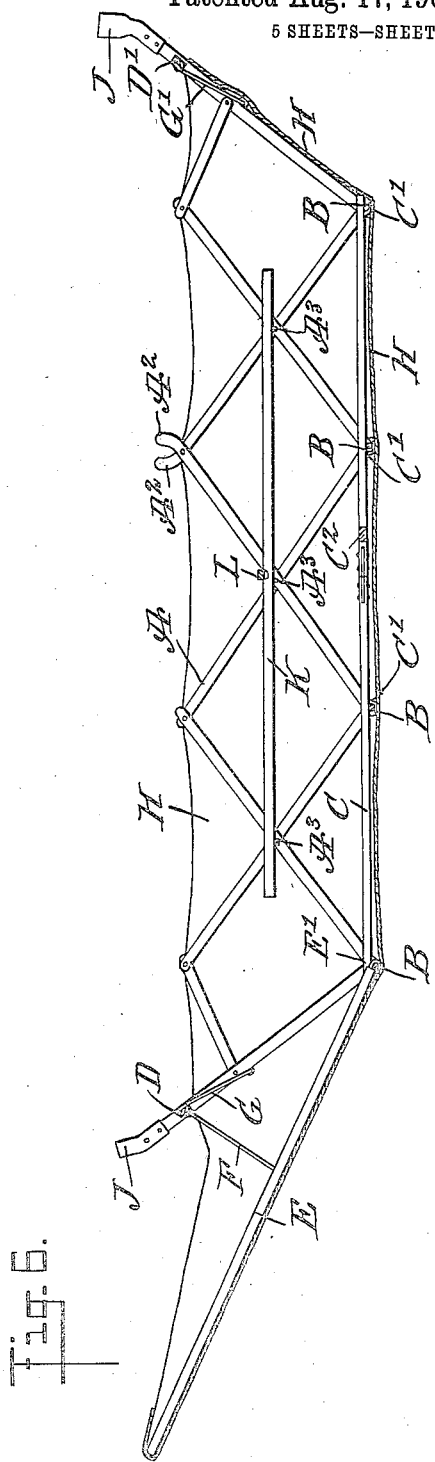
WITNESSES
INVENTOR
Joseph Vaghi
BY
ATTORNEYS

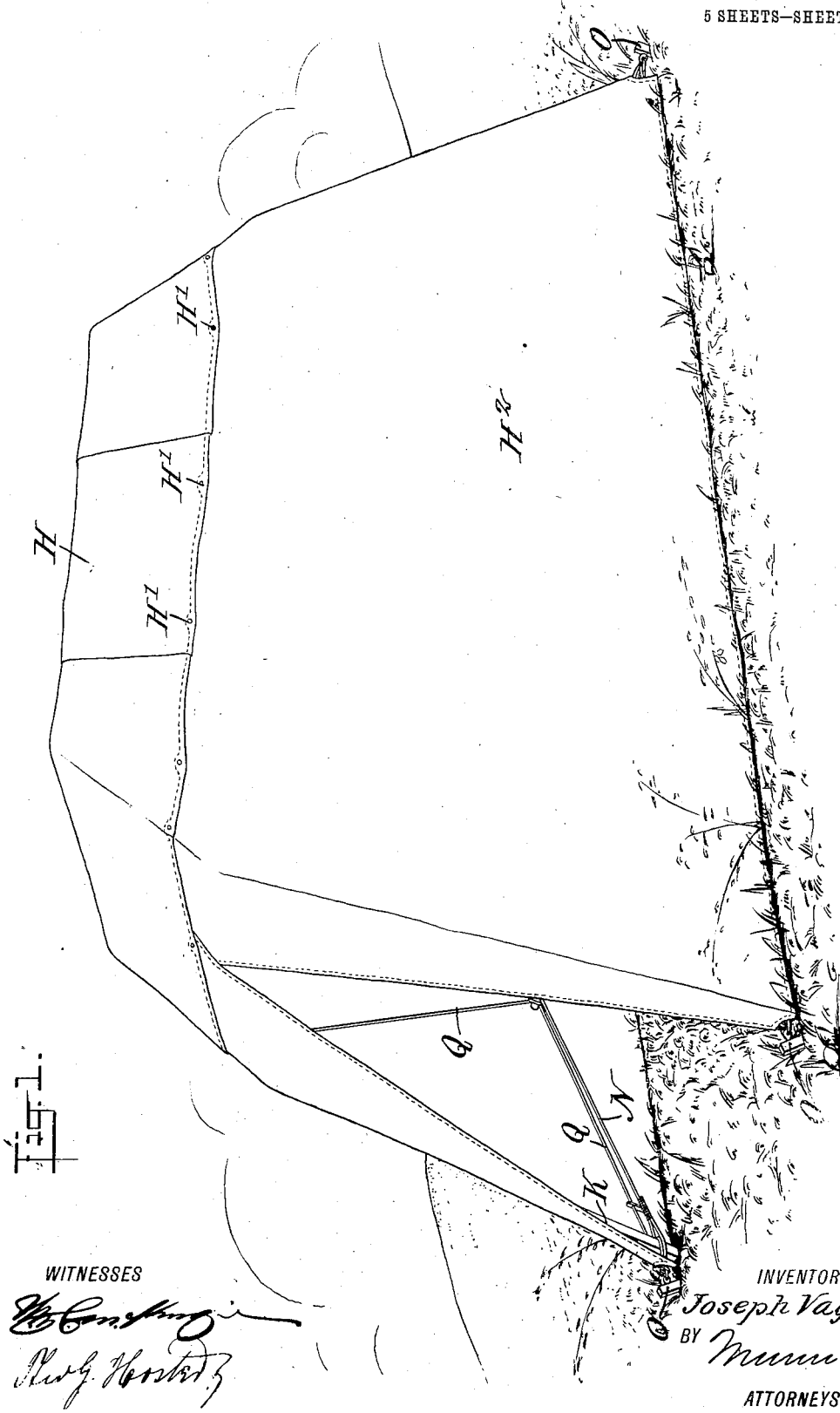

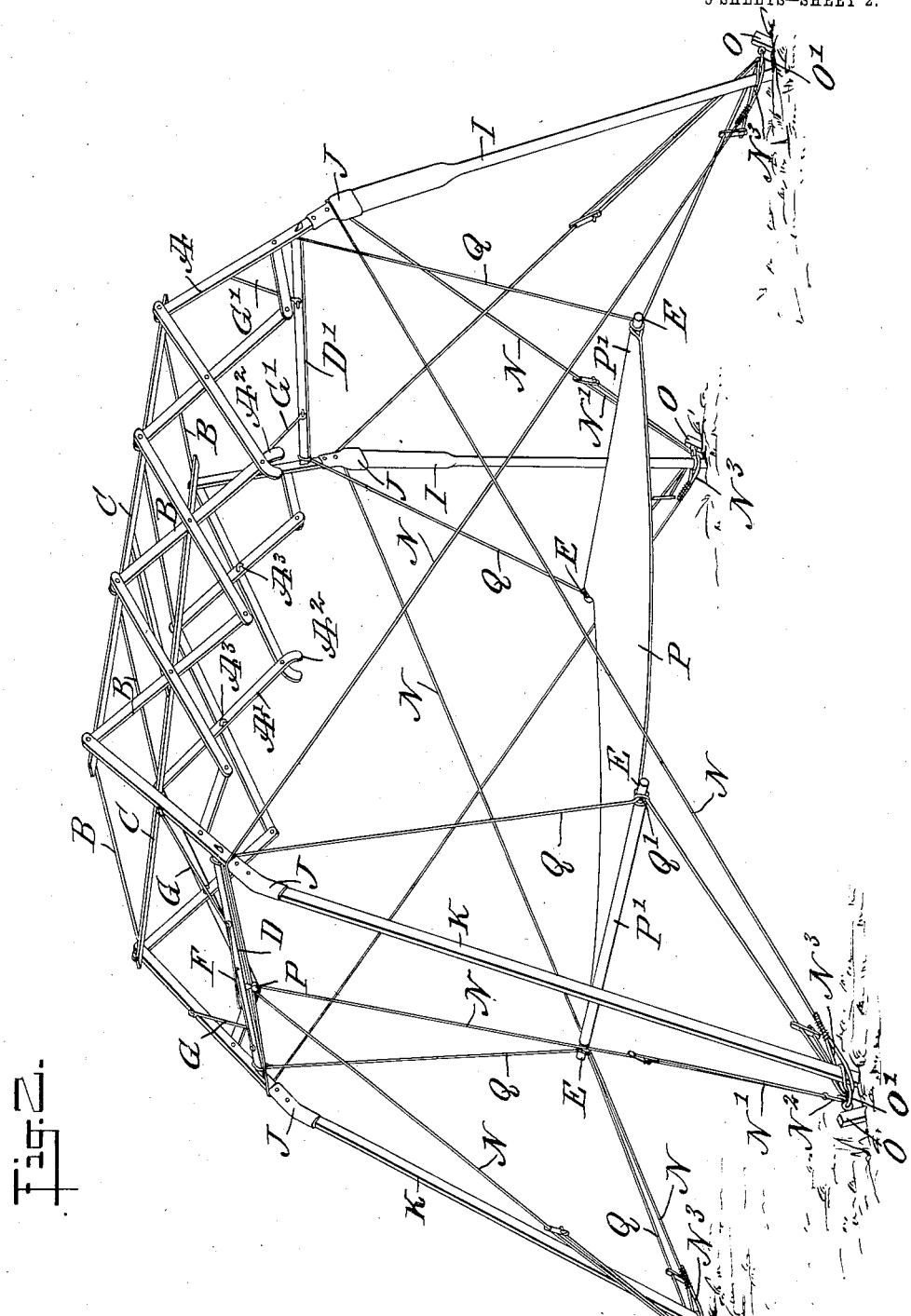

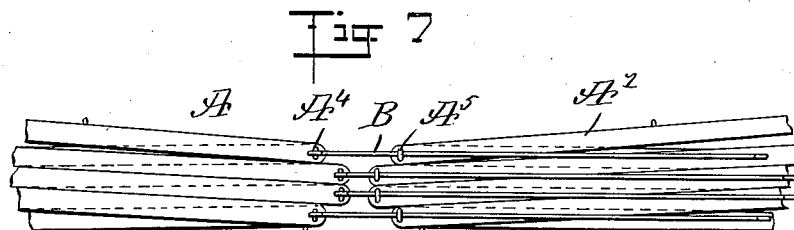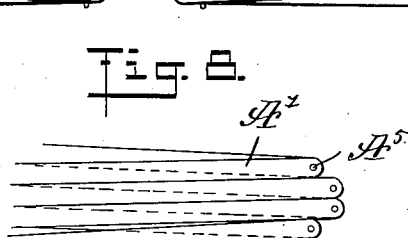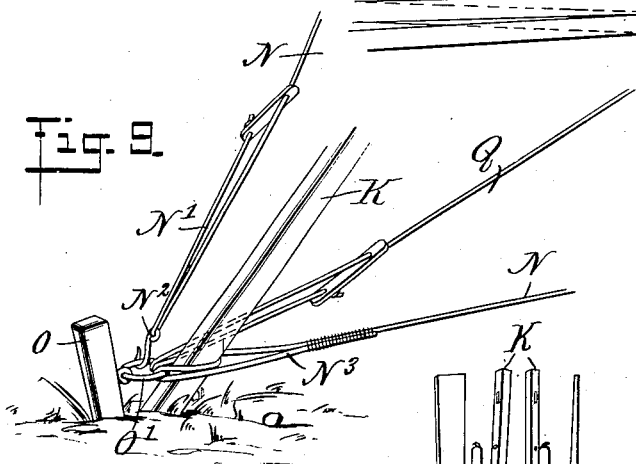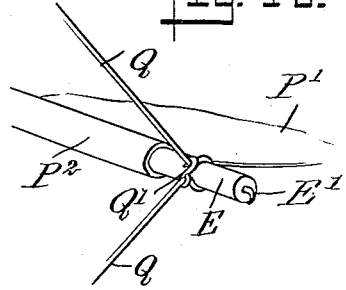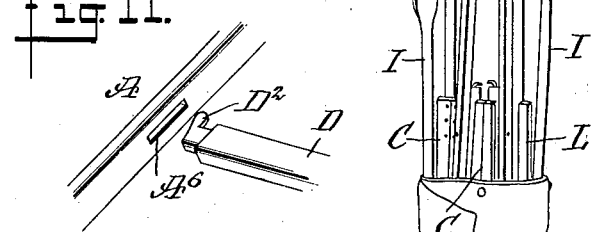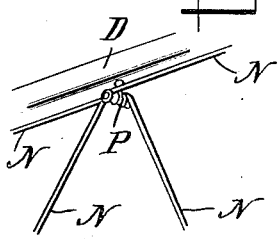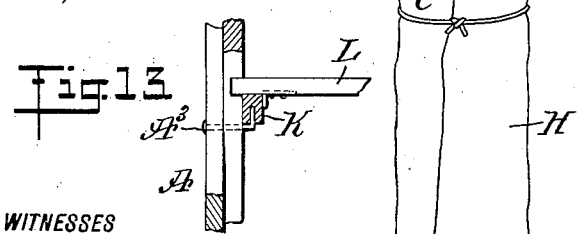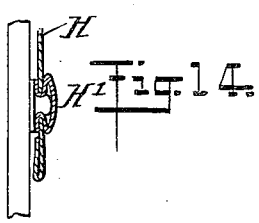

UNITED STATES PATENT OFFICE.

JOSEPH VAGHI, OF BETHEL, CONNECTICUT.

CONVERTIBLE BOAT AND TENT.

No. 931,529.

Specification of Letters Patent.

Patented Aug. 17, 1909.

Application filed March 5, 1909. Serial No. 481,251.

*To all whom it may concern:*

Be it known that I, JOSEPH VAGHI, a subject of the King of Italy, and a resident of Bethel, in the county of Fairfield and State of Connecticut, have invented a new and Improved Convertible Boat and Tent, of which the following is a full, clear, and exact description.

The object of the invention is to provide a new and improved convertible boat and tent, arranged to enable the user to readily convert it into a tent or into a boat, or to fold it up into a comparatively small bundle for conveniently storing or transporting it from place to place.

To attain the object, use is made of a foldable boat adapted to form the roof of the tent, the oars and the removable beam of the boat being arranged to form tent posts for supporting the boat upside down as the roof of the tent.

A practical embodiment of the invention is represented in the accompanying drawings forming a part of this specification, in which similar characters of reference indicate corresponding parts in all the views.

Figure 1 is a perspective view of the improvement set up as a tent; Fig. 2 is a perspective view of the same, showing the tent and boat covering removed; Fig. 3 is a perspective view of the improvement set up as a boat; Fig. 4 is a perspective view of the same, showing the fabric covering of the boat removed and a skeleton boat supported on trestles; Fig. 5 is a plan view of the boat; Fig. 6 is a longitudinal sectional elevation of the same on the line 6—6 of Fig. 5; Fig. 7 is a plan view of the connected sides of the boat partly folded; Fig. 8 is a like view of the same folded; Fig. 9 is a perspective view of the lower end of one of the tent poles and the several guy ropes connected therewith; Fig. 10 is a perspective view of the means for suspending a hammock in the tent and for keeping the hammock in stretched condition; Fig. 11 is a perspective view of the fastening means for connecting the ends of the top cross bars of the boat to the sides thereof at the bow and stern; Fig. 12 is a perspective view of the top guide for the tent guy ropes; Fig. 13 is a cross section of the boat seat and its support at one of the sides of the boat; Fig. 14 is a cross section of one of the fastenings for the tent and boat coverings; and Fig. 15 is a perspective view of the parts folded up for storage or transportation.

The foldable boat is provided with the sides A, A' formed of lazy tongs and connected with each other at the bottom by cross bars B and held in an extended position by a transverse brace $C^2$, and by longitudinal side beams C having hooks C' at the under side engaging the cross bars B, and the front and rear members of the lazy tongs for the boat sides A, A' are connected with each other by removable top cross bars D, D', thus giving the desired rigidity to the boat. The front bottom cross bar B is engaged by hooks E' on the inner ends of bowsprit beams E, extending upwardly and converging toward each other, to touch at their outer ends, the bowsprit beams being held in this position by links F hinged on the front top cross bar D, and removably engaging at their inner ends apertures in the beams E. Braces G and G' connect the top cross bars D and D' with the front and rear members of the lazy tongs for the sides A and A', thus increasing the rigidity of the boat.

The skeleton boat formed in the manner described is provided with a removable covering H of canvas or other suitable material, stretched over the bottom, sides, rear end and bowsprit beams E, as will be readily understood by reference to Fig. 3, the covering H being fastened in place by suitable fastening devices H', such as shown in Fig. 14, and preferably of the ball and socket type. The connected members of the lazy tongs forming the sides A, A' are provided at the top with extensions $A^2$ forming row locks for the reception of oars I, employed in the usual manner, for propelling the boat on the water. The front and rear members of the lazy tongs for the sides A and A' are provided with sockets J for receiving the oars I and removable beams K, to support the boat in an inverted position as the roof of the tent, as will be readily understood by reference to Figs. 1 and 2.

The oarsman is seated on a seat L supported on the longitudinal beams K, removably held on the middle pivots $A^3$ of the lazy tongs (see Fig. 13), and the said longitudinal beams K also serve to increase the rigidity of the skeleton boat.

In order to permit of folding the boat into a comparatively small space, each longitudinal bottom beam C is made in sections, connected with each other by hinges $C^2$, as shown in Figs. 5 and 6, to allow of doubling up the beams C when disconnected from the cross bars B. Each of the cross bars B is fulcrumed at one end on a corresponding bottom pivot $A^4$ of connected lazy tong members of the side A, as indicated in Fig. 7, and each cross rod B has a sliding connection with the corresponding pivot $A^5$ at the bottom of a pair of connected members for the side A', so that the side A' can be moved toward the side A, as indicated in Fig. 7, and then the side A' can be folded onto the side A, as the cross bars B are free to swing on the pivots $A^4$ (see Fig. 8). The connection of each cross bar D with the corresponding front or rear member of the lazy tongs for the sides A and A' is preferably in the form of a hook $D^2$ (see Fig. 11), engaging a socket $A^6$ on the corresponding lazy tong member.

When the device is set up as a tent, as shown in Figs. 1 and 2, then use is made of guy ropes N, each having a doubled up end N' for lengthening and shortening the guy rope, the end N' engaging a hook $N^2$ adapted to hook onto a ring O' held on a plug O driven into the ground adjacent to the lower end of the corresponding tent pole, formed of the beams K and oars I, as previously mentioned. The guy ropes N extend up over guide ways P attached to the front and rear cross beams D and D', to then extend transversely and pass over the corresponding front and rear lazy tong member adjacent to the socket J thereof, and to then pass diagonally down with the end terminating in a loop $N^3$ engaging the corresponding tent pole at the lower end thereof.

When the tent is set up, use is made of a hammock P within the tent, and having its ends provided with pockets P' for the reception of the bowsprit beams E, suspended by ropes Q from the front and rear top cross bars D and D', as plainly indicated in Fig. 2, the ropes Q being looped around the ends of the beams E, and held in place thereon by links Q', and then the ropes Q extend to the rings O', previously mentioned, the lower terminals of the ropes Q having means for lengthening and shortening the ropes, to draw the ropes sufficiently tight for properly supporting the hammock P' in a stretched condition. A covering $H^2$ for the sides and ends of the tent is stretched over the tent poles formed by the beams E and oars I, and the upper end of this covering $H^2$ is fastened by fastening devices H' to the lower ends of the casing H, so as to provide a complete covering for the tent, one end of which may be partly left open, as indicated in Fig. 1.

Having thus described my invention, I claim as new and desire to secure by Letters Patent:

1. A foldable boat, comprising sides each formed of lazy tongs, bottom cross bars connecting the said sides with each other, front and rear removable top cross bars connecting the opposite front and rear members of the lazy tongs with each other, longitudinal bottom beams removably attached to the said sides, converging bowsprit beams removably attached to the front bottom cross bar, links connecting the front top cross bar with the said bowsprit beams, and a fabric covering stretched over the said sides, the rear end and the said bowsprit beams.

2. A foldable boat provided with sides and formed of lazy tongs, and bottom cross bars connecting the said sides with each other, each cross bar being fulcrumed on one side and slidingly engaging the other side.

3. A convertible boat and tent, comprising a boat having sides formed of lazy tongs, bottom cross bars fulcrumed on one side and slidingly engaging the other side, longitudinal bottom bars removably held on the said cross bars, seat beams removably mounted on the middle pivots of the said lazy tongs, a seat supported on the said seat beams, sockets at the end members of the said lazy tongs, and a pair of oars adapted to engage some of the said sockets to form one set of tent poles, the remaining sockets being adapted to receive the said seat beams to form another set of tent poles.

4. A convertible boat and tent, comprising a boat adapted to form the roof of the tent, oars forming a pair of tent poles, removable seat beams on the said boat for forming another set of tent poles, sockets in the ends of the said boat for receiving the said tent poles to support the boat in an inverted position as the roof of the tent, and a hammock within the tent and supported from the said boat.

5. A convertible boat and tent, comprising a boat adapted to form the roof of the tent, oars forming a pair of tent poles, removable seat beams on the said boat for forming another set of tent poles, sockets in the ends of the said boat for receiving the said tent poles to support the boat in an inverted position as the roof of the tent, a hammock within the said tent and having pockets at the ends, removable bowsprit beams on the said boat and adapted to engage the said pockets, and ropes held on the boat for engagement with the said bowsprit beams to support the hammock in the tent.

6. A convertible boat and tent, comprising a boat adapted to form the roof of the tent, oars forming a pair of tent poles, removable seat beams on the said boat for forming another set of tent poles, sockets in the ends of the said boat for receiving the said tent poles to support the boat in an inverted position as the roof of the tent, a hammock within the tent and support from the said boat, and guy ropes connected with the boat to sustain the tent.

7. A convertible boat and tent comprising a boat adapted to form the roof of the tent, oars forming one pair of tent poles, and removable seat beams for forming another set of tent poles, said boat having sockets at the ends thereof for receiving the tent poles to support the boat in inverted position.

8. A foldable boat having sides formed of lazy tongs, a pair of connected members of the said lazy tongs for each side having top extensions, which are curved toward each other for forming row locks.

9. A convertible boat and tent comprising a foldable boat having sockets at the ends thereof, oars and removable seat beams for engaging the sockets to support the boat in inverted position, a hammock within the tent and guy ropes connected with the corners of the hammock, with the corners of the boat and with the bottom of the corresponding tent pole.

In testimony whereof I have signed my name to this specification in the presence of two subscribing witnesses.

JOSEPH VAGHI.

Witnesses:
   CELESTE GUZZETTE,
   THEO. G. HOSTER.